United States Patent [19]

Vanbrabant

[11] Patent Number: 4,679,192
[45] Date of Patent: Jul. 7, 1987

[54] ARRANGEMENT FOR TRANSMITTING DIGITAL DATA

[75] Inventor: Jean-Pierre C. R. Vanbrabant, Eindhoven, Netherlands

[73] Assignee: U.S. Philips Corporation, New York, N.Y.

[21] Appl. No.: 821,938

[22] Filed: Jan. 24, 1986

[30] Foreign Application Priority Data

Feb. 19, 1985 [NL] Netherlands ............... 8500462

[51] Int. Cl.$^4$ ............... H04J 3/02; H04J 3/16
[52] U.S. Cl. ............... 370/85; 370/96; 340/825.08; 340/825.52
[58] Field of Search ............... 370/85, 89, 90, 92, 370/93, 96; 340/825.06, 825.07, 825.08, 825.52, 825.53, 825.54

[56] References Cited

U.S. PATENT DOCUMENTS

| | | | |
|---|---|---|---|
| 3,757,050 | 9/1970 | Mizote | 370/85 |
| 4,149,144 | 4/1979 | Diefenderfer | 370/85 |
| 4,156,112 | 5/1979 | Moreland | 370/85 |
| 4,320,502 | 3/1982 | deVeer | 370/85 |
| 4,426,697 | 1/1984 | Petersen et al. | 370/85 |
| 4,586,040 | 4/1986 | Akiba et al. | 340/825.08 |

*Primary Examiner*—Douglas W. Olms
*Assistant Examiner*—Wellington Chin
*Attorney, Agent, or Firm*—Jack E. Haken; James J. Cannon, Jr.

[57] ABSTRACT

For the orderly transmission of digital data between stations $S_1$-$S_n$ connected to a common communication path B, it is useful to provide an access and addressing procedure. According to the invention, a main station MS which is also connected to the communication path B distributes clock pulses which are counted in the stations $S_1$-$S_n$. When there is agreement between the station number (ADDR) and the counting position (CNTR) the relevant station is enabled $S_i$ to transmit digital data to one of the other stations.

4 Claims, 3 Drawing Figures

ARRANGEMENT FOR TRANSMITTING DIGITAL DATA

BACKGROUND OF THE INVENTION

The invention relates to an arrangement for transmitting digital data, comprising a plurality of stations which together with a main station are connected to a common communication path, these stations comprising a data transmitter, a data receiver and addressing means.

Such an arrangement is disclosed in German patent application No. 25 21 388, which has been laid open to public inspection. In that arrangement the individual stations are sequentially addressed by the main station. The addressed station is then enabled to transmit data to the main station.

SUMMARY OF THE INVENTION

The invention has for its object to provide an arrangement of the above-described type which allows these stations to transmit data directly to any other station and which also provides a simple acces and addressing procedure. According to the invention, the type of arrangement described in the opening paragraph is characterized in that the main station comprises a disableable clock pulse generator, that the addressing means of each station comprise a clock pulse counter for counting the clock pulses transmitted by the clock pulse generator via a clock channel which forms part of the communication path, that the addressing means further comprise an address register and a comparator arrangement for comparing the instantaneous counting position of the clock pulse counter with the content of the address register, that when there is equality between this counting position and this content and a communication request is present at an addressed station a switching signal is generated by the addressed station which signal disables the clock pulse generator via a SEND-channel forming part of the communication path, that the relevant station transmits digital data via a data channel forming part of the communication path to an addressed station and that after the data transmission has ended the disabling of the clock pulse generator is cancelled via the SEND-channel which forms part of the communication path.

The invention has for its advantage that the stations can directly transmit data to each other, that is to say without the intermediary of the central station. A further advantage is that utilizing the clock pulses generated by the clock pulse generator also for accessing and addressing purposes results in a very simple efficient realization of the arrangement.

It is advantageous that the clock pulse counter of each station has a reset input which input is connected to a reset channel forming part of the communication path, that the central station comprises reset means connected to the reset channel for periodically resetting the clock pulse counters.

It is further advantageous when the channels forming part of the communication path are each realized by a physically separate line.

It is advantageous that each station comprises a local clock pulse generator, which local clock pulse generator during data transport transmits clock pulses to the other stations via the clock channel forming part of the communication path and that each station comprises blocking means for blocking the counting input transmitted by the sending station.

BRIEF DESCRIPTION OF THE DRAWINGS

An embodiment of the invention will now be described in detail by way of example with reference to the accompanying drawing, in which identical components in the several Figures are given the same reference numerals. Therein.

DESCRIPTION OF THE PREFERRED EMBODIMENT

Figure 1:
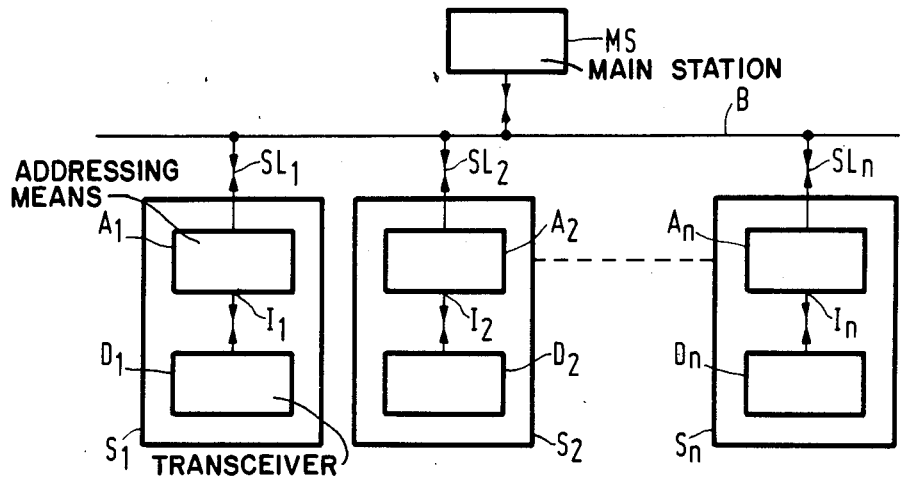
FIG. 1 shows a block circuit diagram of the arrangement according to the invention.

In FIG. 1, B denotes a communication path to which a main station MS and a number of stations $S_1, S_2, \ldots S_n$ are connected. The n stations $S_1, S_2, \ldots S_n$ are arranged for transmitting digital data from any station $S_i$ to any other station $S_j$, utilizing the common communication path B. Each station $S_i$ comprises addressing means $A_i$ and a data transceiver $D_i$. The addressing means $A_i$ are connected to the communication path B via link $SL_i$, while the data transceivers $D_i$ are connected to access port $I_i$ of the addressing means $A_i$.

Figure 2:
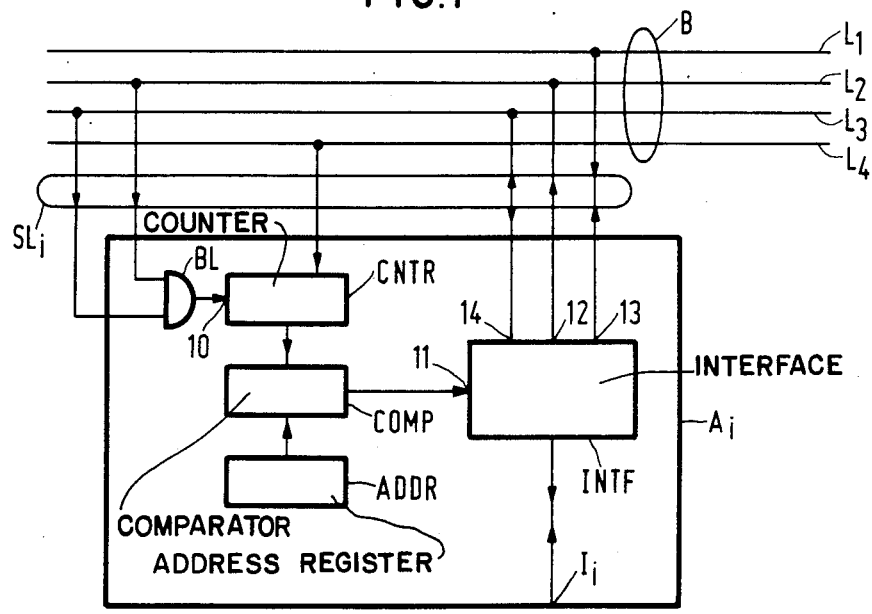
FIG. 2 shows a block circuit diagram of a station for use in the arrangement of FIG. 1.

The addressing means $A_i$, which are shown in greater detail in FIG. 2, comprise a clock pulse counter CNTR, a comparator arrangement COMP and an address register ADDR. An input 10 of clock pulse counter CNTR is coupled via blocking means BL, still further to be described, to a clock channel which forms part of the communication path B and is represented in the Figure as a separate line $L_3$. The communication path B is used in common by all these stations. To avoid mixing of data the communication path B and, more specifecely, the data channel is assigned in turn to one station at a time. The assignment procedure is as follows.

Figure 3:
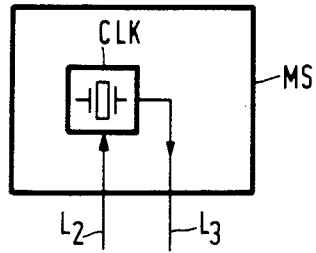
FIG. 3 shows a block circuit diagram of a main station for use in the arrangement of FIG. 1.

The main station MS (FIG. 3) comprises a disableable clock pulse generator CLK connected to the clock channel (line $L_3$). The clock pulses on line $L_3$ are counted in the counter CNTR (FIG. 2) of the addressing means $A_i$. The counting position of counter CNTR is compared with the content of the address register ADDR by applying both signals to a comparator arrangement COMP. The content of the address register is unique for each station. If the instantaneous counting position of counter CNTR corresponds to the content of adress register ADDR then the comparator arrangement COMP applies a signal ENAB to an input 11 of an interface arrangement INTF. Thereafter the interface arrangement INTR produces at output 12 a signal which disables the clock pulse generator CLK (FIG. 3) in the main station MS via a SEND-channel (a separate line $L_2$ in the Figure) which forms part of the communication path B. In response thereto clock pulses no longer appear on line $L_3$ and consequently counters CNTR all remain in their last counting position.

The station of which the counting position of counter CNTR is equal to the content of the address register ADDR is thereafter—consequently after the ENAB-signal has appeared—given the opportunity to transmit data to any other station. To that end, transceiver $D_i$ which is connected via access port $I_i$ to the addressing means $A_i$, is connected via an output of the interface circuit INTF to a data channel, shown in the Figure as a line $L_1$, which forms part of the communication path B. Synchronizing the receiving station is effected in that the interface circuit INTF of the sending station transmits clock pulses to the receiving station via an output 14 and line $L_3$. For that purpose the interface circuit INTF comprises a local clock pulse generator (not shown) an output of which is connected to output 14 of interface circuit INTF. To prevent tthe clock pulses on line $L_3$ from incrementing the counters CNTR, the blocking means BL block the access of the clock pulses to input 10 of counters CNTR for the same period of time as the clock pulse generator CLK in the main station is disabled via the SEND-signal on line $L_2$. To that end, line $L_2$ is connected together with a line $L_3$ to inputs of the blocking means BL.

At the end of the transmission of data from one station to the other, the transmitting station no longer transmits data and clock signals and the SEND-signal is switched of. The last-mentioned fact results in the disabling of the clock pulse generator CLK in the main station MS being cancelled, and clock pules generated by the main station appear again on line $L_3$, which pulses are counted again in the counters CNTR which are also enabled again. When it has been found that there is agreement between the new counting position and the content of the address register of another station that station can also access the data channel.

The SEND-signal transmitted by the selected station $S_i$ to the main station MS is—in a preferred embodiment—replied to by the main station MS by a CTS-signal (Clear To Send).

The communication path B further comprises a fourth channel, denoted by line $L_4$ in the drawing, which has for its object to reset the counters CNTR after the desired cycle has been completely passed through. For the case in which 256 stations are connected to the common communication path B and one of the numbers between 1 and 256 is assigned to each station, the counters CNTR are reset after 256 consecutive clock pulses and a new cycle starts.

Although the description of the embodiment is based on a communication path formed by several physically separate conductors $L_1$, $L_2$, $L_3$, $L_4$ it will be obvious that one physical conductor is sufficient if a plurality of channels are created on that line in frequency-division or time-division multiplex.

What is claimed is:

1. An arrangement for transmitting digital data, comprising a plurality of stations which together with a main station are connected to a common communication path, these stations comprising a data transmitter, a data receiver and addressing means, characterized in that said main station comprises a disableable clock pulse generator, that said addressing means of each station comprise a clock pulse counter for counting the clock pulses transmitted by said clock pulse generator via a clock channel which forms part of said communication path, that said addressing means further comprise an address register and a comparator arrangement for comparing the instantaneous counting position of said clock pulse counter with the content of said address register, that when there is equality between said counting position and said content and a communication request is present at an addressed station a switching signal is generated by the addressed station which signal disables said clock pulse generator via a SEND-channel forming part of said communication path, that said addressed station transmits digital data via a data channel forming part of said communication path to a second addressed station and that after the data transmission has ended the disabling of said clock pulse generator is cancelled via said SEND-channel which forms part of said communication path.

2. An arrangement as claimed in claim 1, characterized in that said clock pulse counter of each station has a reset input, which input is connected to a reset channel forming part of said communication path and that said main station comprises reset means connected to said reset channel for periodically resetting the clock pulse counters.

3. An arrangement as claimed in claim 1 or 2, characterized in that said channels belonging to said communication path are each realized by a physically separate line.

4. An arrangement as claimed in claim 1, characterized in that each station comprises a local clock pulse generator, which local clock pulse generator during the data transport transmits clock pulses to other stations via said clock channel forming part of said communication path, and that each station comprises blocking means for blocking the counting input of said clock pulse counter for clock pulses transmitted by a transmitting station.

* * * * *